(12) United States Patent
Kobayashi

(10) Patent No.: US 11,243,433 B2
(45) Date of Patent: Feb. 8, 2022

(54) IMAGE DISPLAY DEVICE AND IMAGE DISPLAY METHOD

(71) Applicant: SHARP KABUSHIKI KAISHA, Sakai (JP)

(72) Inventor: Masamitsu Kobayashi, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 25 days.

(21) Appl. No.: 16/936,876

(22) Filed: Jul. 23, 2020

(65) Prior Publication Data
US 2021/0033931 A1    Feb. 4, 2021

Related U.S. Application Data

(60) Provisional application No. 62/881,492, filed on Aug. 1, 2019.

(51) Int. Cl.
| | |
|---|---|
| G02F 1/13357 | (2006.01) |
| G09G 3/36 | (2006.01) |
| G02F 1/1335 | (2006.01) |

(52) U.S. Cl.
CPC ......... *G02F 1/133611* (2013.01); *G09G 3/36* (2013.01); *G02F 1/133613* (2021.01)

(58) Field of Classification Search
CPC ......... G02F 1/133611; G06F 1/133613; G09G 2310/0235; G09G 2310/024
See application file for complete search history.

(56) References Cited

U.S. PATENT DOCUMENTS

| | | | |
|---|---|---|---|
| 2012/0274667 A1 | 11/2012 | Kuwayama et al. | |
| 2016/0057410 A1* | 2/2016 | Huang | G02B 30/24 348/53 |
| 2016/0293115 A1* | 10/2016 | Yamashita | G09G 3/3406 |

FOREIGN PATENT DOCUMENTS

JP    2012-237982 A    12/2012

* cited by examiner

*Primary Examiner* — Kevin M Nguyen
(74) *Attorney, Agent, or Firm* — ScienBiziP, P.C.

(57) ABSTRACT

In an image display device having a backlight including a plurality of light sources, the backlight is divided into a plurality of areas arranged in the same direction as an order of writing to pixels. A backlight drive circuit sets lighting periods separately for each of the areas and causes the brightness of the light sources to rise and drop in a non-step manner during the corresponding lighting period. In a case where first and second areas are adjacent to each other, there is a period of overlap between a lighting period set for the first area and a lighting period set for the second area, and the period of overlap includes a middle portion in which the brightness of light sources corresponding to the first area drops and the brightness of light sources corresponding to the second area rises.

14 Claims, 12 Drawing Sheets

IMAGE DISPLAY DEVICE AND IMAGE DISPLAY METHOD

BACKGROUND

1. Field

The present disclosure relates to image display devices and, in particular, to an image display device having a backlight.

2. Description of the Related Art

Liquid crystal display devices are widely used as low-profile, light-weight, and low-power-consumption image display devices. Liquid crystal panels included in liquid crystal display devices are non-luminous display panels. For this reason, a large number of liquid crystal display devices are provided with backlights that illuminate liquid crystal panels from behind. The following discusses, as an example of an image display device having a backlight, a liquid crystal display device having a backlight.

The liquid crystal display device may have lower moving image display performance when the backlight in always on. To address this problem, a method for flashing driving (blinking backlight driving) of the backlight or a method for scan driving of the backlight is known as a method for attaining higher moving image display performance. When the liquid crystal display device is a liquid crystal display device that performs flashing driving, a lighting period of the backlight is set within one frame period, and the backlight glows only within the lighting period. When the liquid crystal display device is a liquid crystal display device that performs scan driving, the backlight is divided into a plurality of areas, and the plurality of areas glow in sequence within one frame period.

FIG. 22 is a diagram showing timings of operation of a liquid crystal display device that performs flashing driving. In the following drawings each showing timings of operation of a liquid crystal display device, the dotted line TM1 indicates a timing of writing to the pixels, the dotted line TM2 indicates a timing at which the tones of the pixels reach desired levels, and the shaded area indicates a lighting period of the backlight. The tones of the pixels change during a period (change period) from a point of time at which writing to the pixels has started to a point of time at which the tones of the pixels reach the desired levels, and do not change during a period (stable period) from the point of time at which the tones of the pixels has reached the desired levels to a point of time at which next writing to the pixels starts. In the example shown in FIG. 22, the backlight glows before the tones of the pth to nth rows of pixels reach the desired levels. This causes a display defect called "ghost" to be formed in the pth to nth rows on the display screen, resulting in lower moving image display performance.

FIG. 23 is a diagram showing timings of operation of a liquid crystal display device that performs scan driving. In the example shown in FIG. 23, the backlight is divided into twenty areas. Each of the areas glows after the tones of a plurality of rows of pixels corresponding to that area have reached the desired levels. This makes it possible to avoid a ghost and attain higher moving image display performance.

In the example shown in FIG. 22, no ghost is formed when the response time of the liquid crystal panel is shorter than T. In the example shown in FIG. 23, no ghost is formed when the response time of the liquid crystal panel is shorter than T2 (>T1). Thus, in comparison with the liquid crystal display device that performs flashing driving, the liquid crystal display device that performs scan driving can avoid a ghost even when the response time of the liquid crystal panel is longer. The liquid crystal display device that performs scan driving is described, for example, in Japanese Patent No. 5919992.

However, the liquid crystal display device that performs scan driving is undesirably high in cost, as it uses a backlight that glows by area. This problem is addressed by a method for reducing the number of areas. However, a reduction in the number of areas raises the need to use a short-response-time liquid crystal panel. For example, in a case where the number of areas is reduced to two in the example shown in FIG. 23, a ghost needs to be avoided by using a liquid crystal panel whose response time is shorter than T3 (<T2) shown in FIG. 24.

Further, in order to avoid an unevenness of brightness on the display screen, the liquid crystal display device that performs scan driving is configured such that emitted light from one area of the backlight enters another area of the backlight (such a phenomenon being hereinafter referred to as "light leakage"). As will be mentioned later, a conventional liquid crystal display device including a backlight in which light leakage occurs has lower moving image display performance with an inflection point formed in a moving image blurring waveform (motion picture response curve/luminance cross-section profile of blurred edge). The inflection point is hard to see when the number of areas is large, but becomes easy to see when the number of areas is reduced.

Possible methods for attaining higher moving image display performance even when the number of areas is reduced include a method for shortening the lighting period of the backlight and increasing the brightness of the backlight accordingly and a method for bringing the lighting period of one area closer to the lighting period of another area. However, even with these methods, the inflection point cannot be removed from the moving image blurring waveform.

It is desirable to provide a low-cost image display device of high moving image display performance.

SUMMARY

According to an aspect of the disclosure, there is provided an image display device including: a display panel including a plurality of pixels; a backlight including a plurality of light sources; a panel drive circuit that drives the display panel; and a backlight drive circuit that drives the backlight, wherein the backlight is divided into a plurality of areas arranged in a same direction as an order of writing to the pixels, the backlight drive circuit sets lighting periods separately for each of the areas and causes a brightness of the light sources to rise and drop in a non-step manner during a corresponding one of the lighting periods, in a case where the plurality of areas include a first area and a second area that are adjacent to each other, there is a period of overlap between a first lighting period set for the first area and a second lighting period set for the second area, and the period of overlap includes a middle portion in which a brightness of first light sources corresponding to the first area drops and a brightness of second light sources corresponding to the second area rises.

According to an aspect of the disclosure, there is provided an image display method for an image display device having a display panel including a plurality of pixels and a backlight including a plurality of light sources, the image display method including: driving the display panel; and driving the backlight, wherein the backlight is divided into a plurality of areas arranged in a same direction as an order of writing to the pixels, the driving the backlight includes setting lighting periods separately for each of the areas and causing a brightness of the light sources to rise and drop in a non-step manner during a corresponding one of the lighting periods, in a case where the plurality of areas include a first area and a second area that are adjacent to each other, there is a period of overlap between a first lighting period set for the first area and a second lighting period set for the second area, and the period of overlap includes a middle portion in which a brightness of first light sources corresponding to the first area drops and a brightness of second light sources corresponding to the second area rises.

These and other objects, features, aspects, and effects of the present disclosure will be made clearer from the following detailed description with reference to the accompanying drawings.

DESCRIPTION OF THE EMBODIMENTS

First Embodiment

Figure 1:
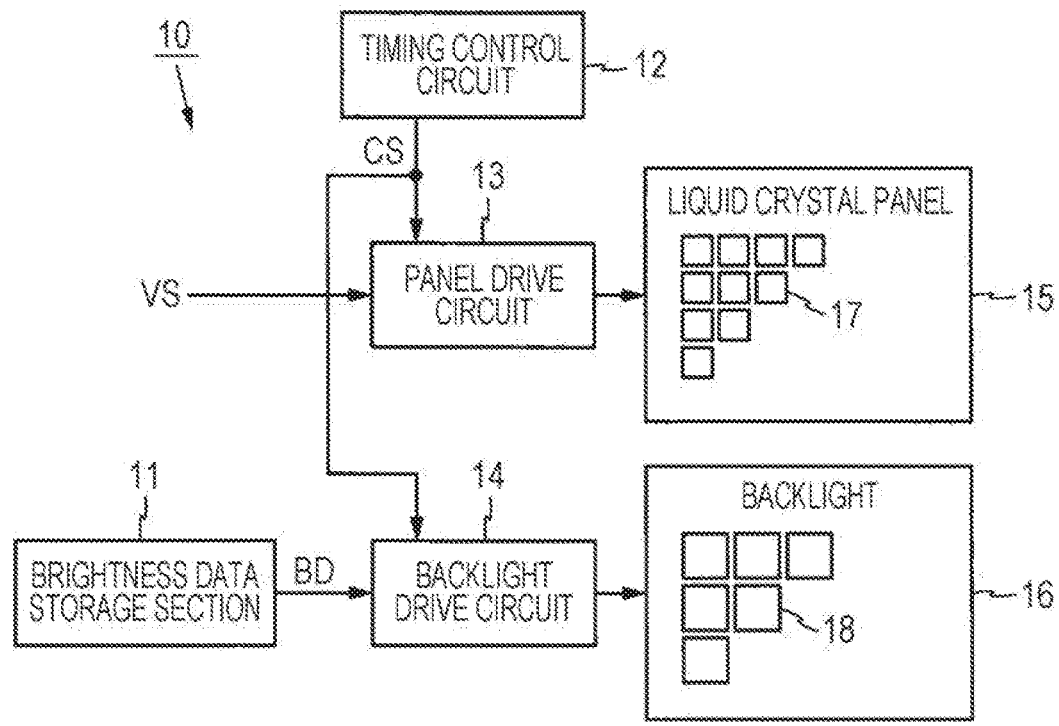
FIG. 1 is a block diagram showing a configuration of a liquid crystal display device according to a first embodiment.

FIG. 1 is a block diagram showing a configuration of a liquid crystal display device according to a first embodiment. A liquid crystal display device 10 shown in FIG. 1 includes a brightness data storage section 11, a timing control circuit 12, a panel drive circuit 13, a backlight drive circuit 14, a liquid crystal panel 15, and a backlight 16. The liquid crystal display device 10 displays an image on the liquid crystal panel 15 in accordance with a video signal VS supplied from an outside source.

The liquid crystal panel 15 includes a plurality of pixels 17 arrayed in a two-dimensional manner. The backlight 16 is disposed behind the liquid crystal panel 15, and illuminates the liquid crystal panel 15 from behind. The backlight 16 includes a plurality of light sources 18 arrayed in a two-dimensional manner. As the light sources 18, LEDs (light-emitting diodes) are used, for example.

The brightness data storage section 11 has brightness data BD stored therein. The timing control circuit 12 outputs a timing control signal CS to the panel drive circuit 13 and the backlight drive circuit 14. The panel drive circuit 13 drives the liquid crystal panel 15 in accordance with the timing control signal CS and the video signal VS. The backlight drive circuit 14 drives the backlight 16 in accordance with the timing control signal CS and the brightness data BD. The panel drive circuit 13 writes to the pixels 17 in an order from the top to the bottom of a display screen (i.e. a display surface of the liquid crystal panel 15).

The backlight 16 is divided into a plurality of areas (here, two areas) arranged in the same direction as the order of writing to the pixels 17. As will be described below, the backlight drive circuit 14 sets lighting periods separately for each of the areas, and causes the brightness of the light sources 18 to rise and drop in a non-step manner during a corresponding one of the lighting periods. The phrase "rise in a non-step manner" here means rising at a set speed during a certain period of time instead of abruptly rising in a short amount of time, and the phrase "drop in a non-step manner" here means dropping at a set speed during a certain period of time instead of abruptly dropping in a short amount of time.

Figure 2:
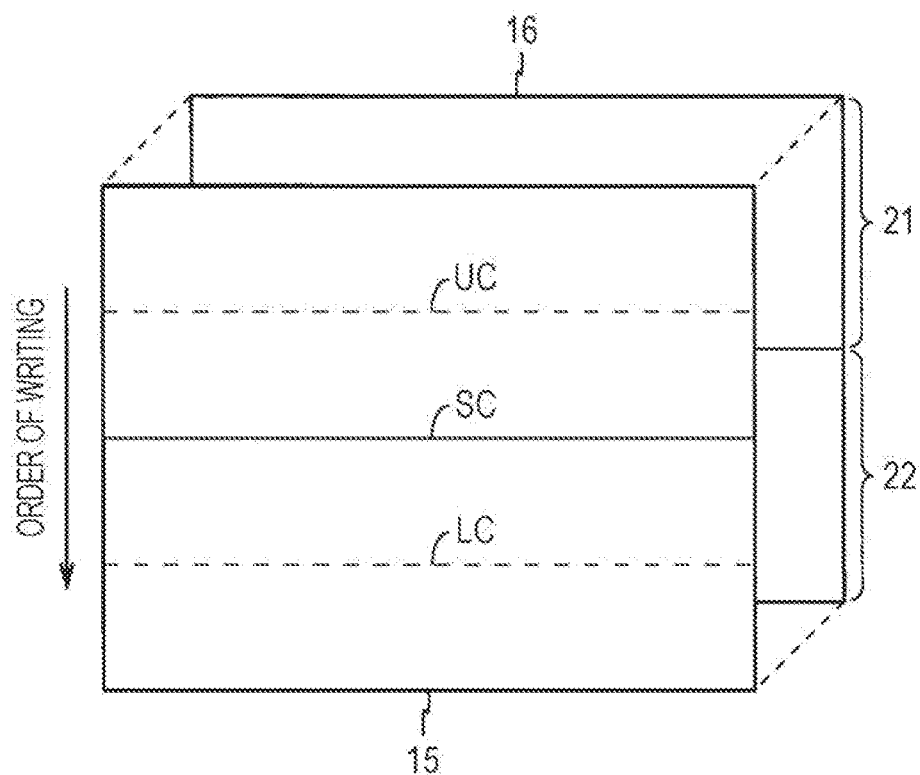
FIG. 2 is a diagram showing a method for dividing a backlight of the liquid crystal display device according to the first embodiment.

FIG. 2 is a diagram showing a method for dividing the backlight 16 of the liquid crystal display device 10 according to the present embodiment. As shown in FIG. 2, the display screen is divided into two equal halves, one above the other. The backlight 16 is divided into an upper area 21 that corresponds to the upper half of the display screen and a lower area 22 that corresponds to the lower half of the display screen.

Those of the light sources 18 which correspond to the upper area 21 are hereinafter referred to as "upper light sources", and those of the light sources 18 which correspond to the lower area 22 are hereinafter referred to as "lower light sources". Further, the upper center UC indicates a position at which the upper half of the display screen is divided into two equal halves, one above the other, the screen center SC indicates a position at which the whole of the display screen is divided into two equal halves, one above the other, and the lower center LC indicates a position at which the lower half of the display screen is divided into two equal halves, one above the other. These positions are referred to collectively as "three positions".

Figure 3:
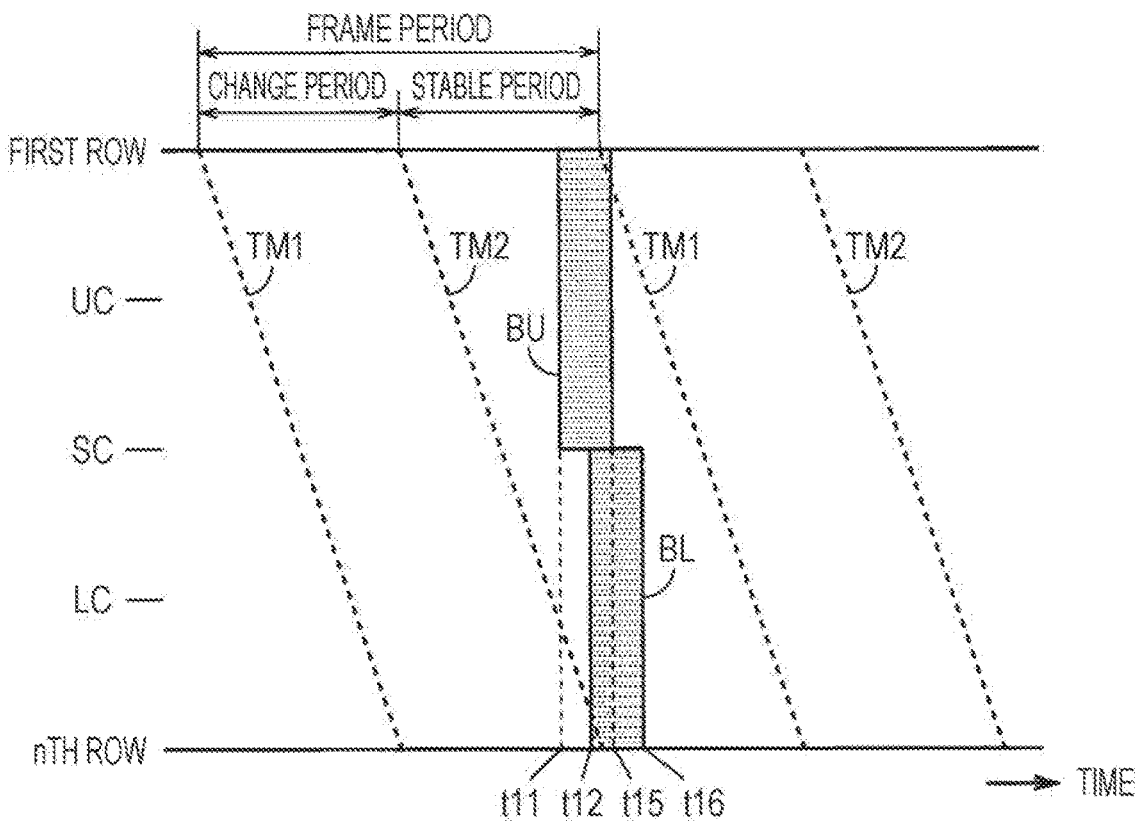
FIG. 3 is a diagram showing timings of operation of the liquid crystal display device according to the first embodiment.

FIG. 3 is a diagram showing timings of operation of the liquid crystal display device 10 according to the present embodiment. In FIG. 3, the shaded area BU indicates a lighting period set for the upper area 21 (such a lighting period being hereinafter referred to as "lighting period of the upper light sources"), and the shaded area BL indicates a lighting period set for the lower area 22 (such a lighting period being hereinafter referred to as "lighting period of the lower light sources"). The upper light sources glow during a period from a point of time t11 to a point of time t15, and the lower light sources glow during a period from a point of time t12 to a point of time t16.

The brightness data BD stored in the brightness data storage section 11 includes data representing changes in brightness of the upper light sources within one frame period and data representing changes in brightness of the lower light sources within one frame period. The backlight drive circuit 14 effects changes in brightness of the upper light sources during the lighting period BU of the upper light sources, and effects changes in brightness of the lower light sources during the lighting period BL of the lower light sources.

Figure 4:
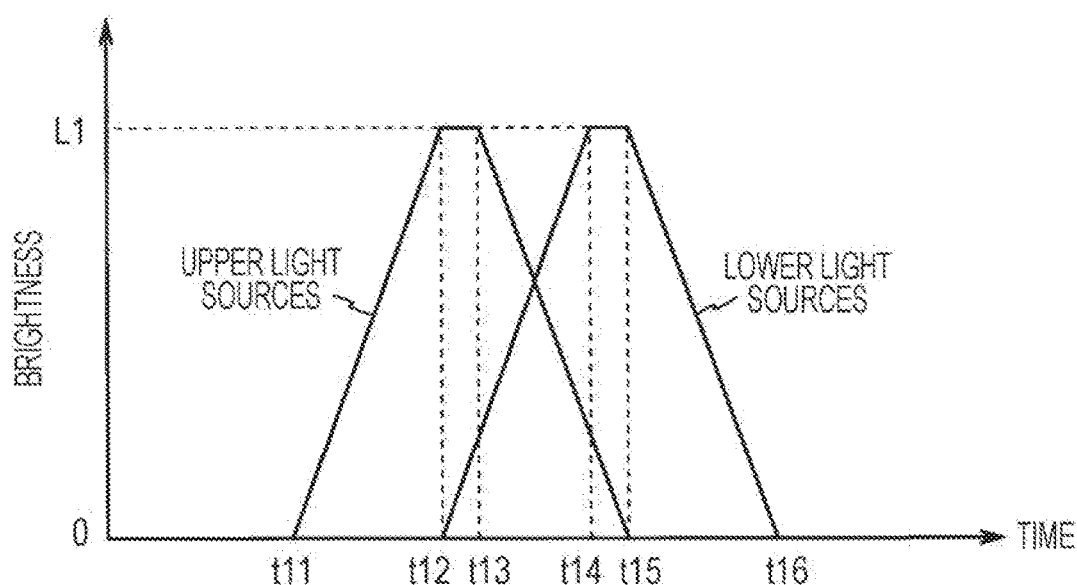
FIG. 4 is a diagram showing changes in brightness of light sources corresponding separately to each of areas of the liquid crystal display device according to the first embodiment.

FIG. 4 is a diagram showing changes in brightness of light sources corresponding separately to each of the areas of the liquid crystal display device 10 according to the present embodiment. As shown in FIG. 4, the brightness of the upper light sources rises from 0 to a level L1 at a speed S1 during a period from the point of time t11 to the point of time t12, keeps the level L1 during a period from the point of time t12 to a point of time t13, and drops from the level L1 to 0 at the speed S1 during a period from the point of time t13 to the point of time t15. The length of the period of time during which the brightness of the upper light sources rises and the length of the period of time during which the brightness of the upper light sources drops are the same as each other.

The brightness of the lower light sources changes in the same way as the brightness of the upper light sources a period of time (t12-t11) behind the brightness of the upper light sources. The brightness of the lower light sources rises from 0 to a level L1 at the speed S1 during a period from the point of time t12 to a point of time t14, keeps the level L1 during a period from the point of time t14 to the point of time t15, and drops from the level L1 to 0 at the speed S1 during a period from the point of time t15 to the point of time t16.

During a period from the point of time t12 to the point of time t15, both the upper light sources and the lower light sources glow. During a period from the point of time t13 to the point of time t14, the brightness of the upper light sources drops, and the brightness of the lower light sources rises. During the period from the point of time t13 to the point of time t14, the speed at which the brightness of the upper light sources drops and the speed at which the brightness of the lower light sources rises are the same as each other (both S1). The length of the period of time (t12-t11) is shorter than a half of the length (t15-t11) of the lighting period of the upper light sources. The length of the period of time during which both the upper light sources and the lower light sources glow is longer than ⅓ of the length of a period of time during which at least either the upper light sources or the lower light sources glow.

In the liquid crystal display device 10 according to the present embodiment, since, during the period from the point of time t13 to the point of time t14, the speed at which the brightness of the upper light sources drops and the speed at which the brightness of the lower light sources rises are the same as each other, the sum of the brightness of the upper light sources and the brightness of the lower light sources stays the same. This makes it possible to, even in a case where the backlight 16 used suffers from light leakage, cancel out the effect of the light leakage at any position within the display screen and avoid an abrupt change in brightness of each of the areas at a point of time other than the starting and ending points of a lighting period. Accordingly, the liquid crystal display device 10 according to the present embodiment makes it possible to remove an inflection point from a moving image blurring waveform even in a case where the number of areas is small. This makes it possible to provide a low-cost image display device of high moving image display performance.

Figure 5:
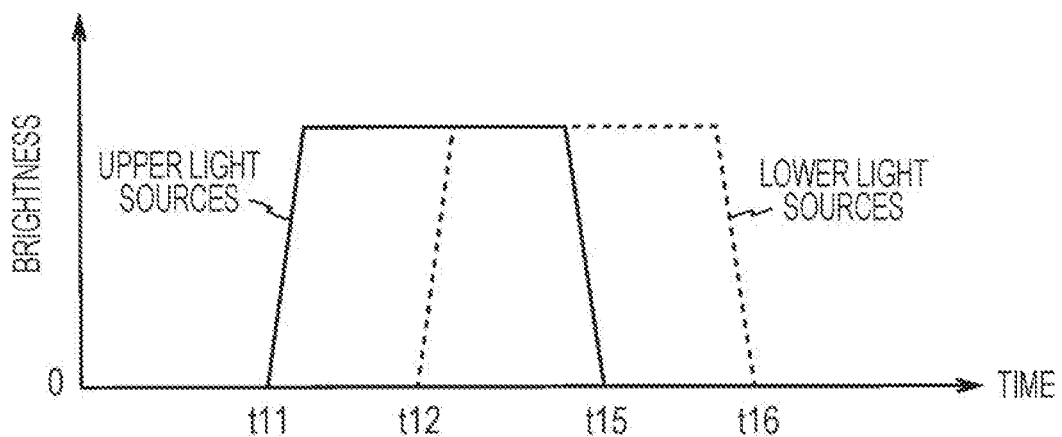
FIG. 5 is a diagram showing changes in brightness of light sources corresponding separately to each of areas of a liquid crystal display device according to a comparative example.
Figure 6:
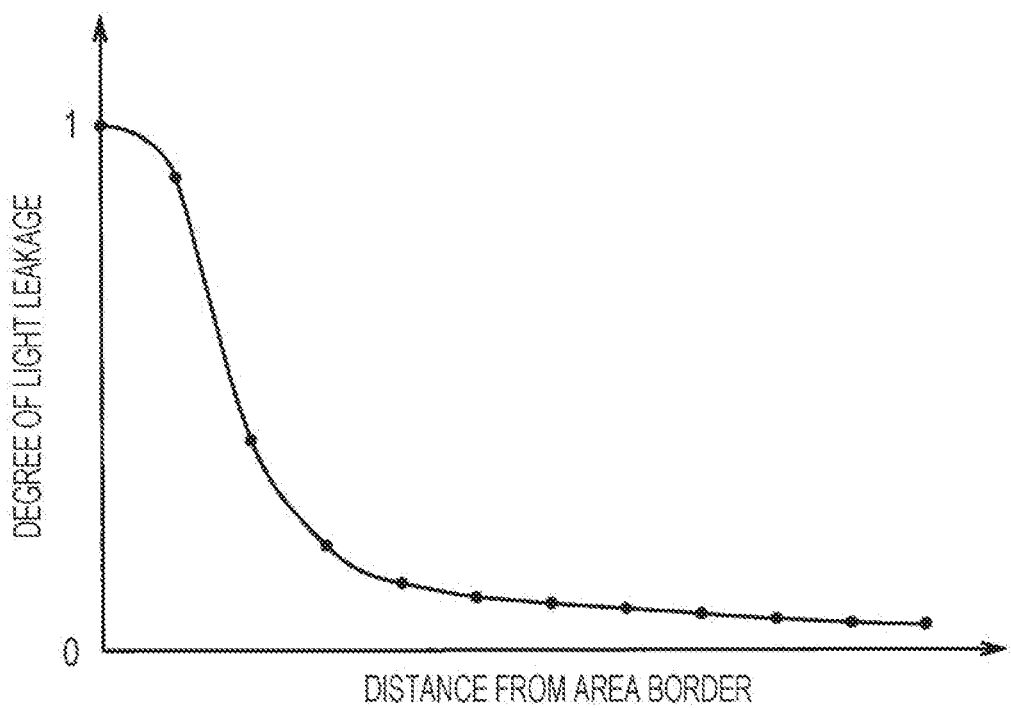
FIG. 6 is a diagram showing a degree of light leakage.

The aforementioned effects are described in contrast with a liquid crystal display device according to a comparative example. Let it be assumed that the liquid crystal display device according to the comparative example is a liquid crystal display device that operates in accordance with the timings shown in FIG. 3 and in which the brightness of light sources corresponding separately to each of areas change as shown in FIG. 5. FIG. 6 is a diagram showing a degree of light leakage. Let it be assumed here that light leakage occurs to the degree shown in FIG. 6 according to distance from an area border.

Figure 7:
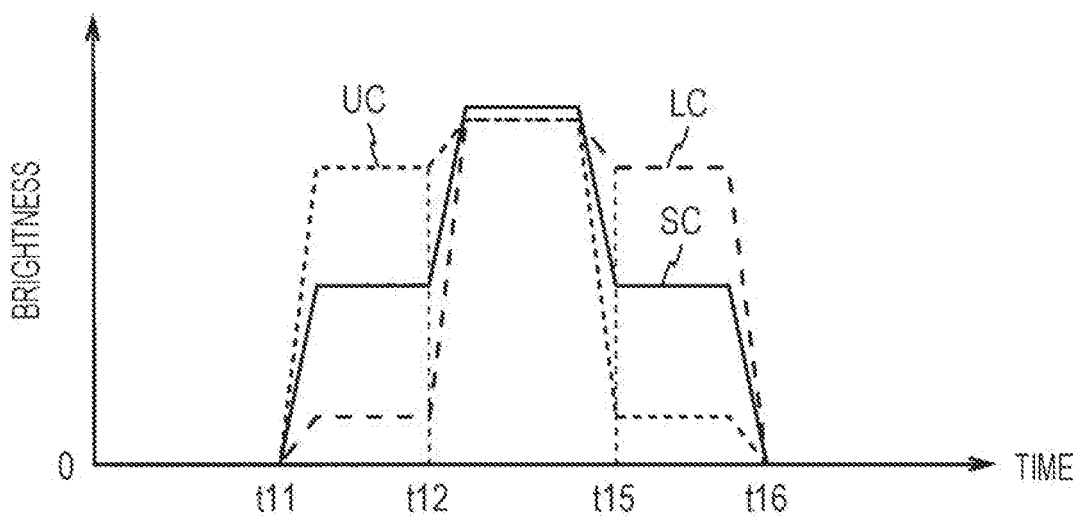
FIG. 7 is a diagram showing changes in brightness of a backlight of the liquid crystal display device according to the comparative example.

FIG. 7 is a diagram showing changes in brightness of the backlight at the three positions in the liquid crystal display device according to the comparative example. In the liquid crystal display device according to the comparative example, the brightness of the lower light sources abruptly rises at around the point of time t12, and the brightness of the upper light sources abruptly drops at around the point of time t15 (FIG. 5). For this reason, as shown in FIG. 7, at the point of time t12, the brightness at the lower center LC and the brightness at the screen center SC abruptly change, and at the point of time t15, the brightness at the screen center SC and the brightness at the upper center UC abruptly change. Thus, the brightness of the backlight at the three positions abruptly changes at the points of time t12 and t15, which are not the starting and ending points of a lighting period.

Figure 8:
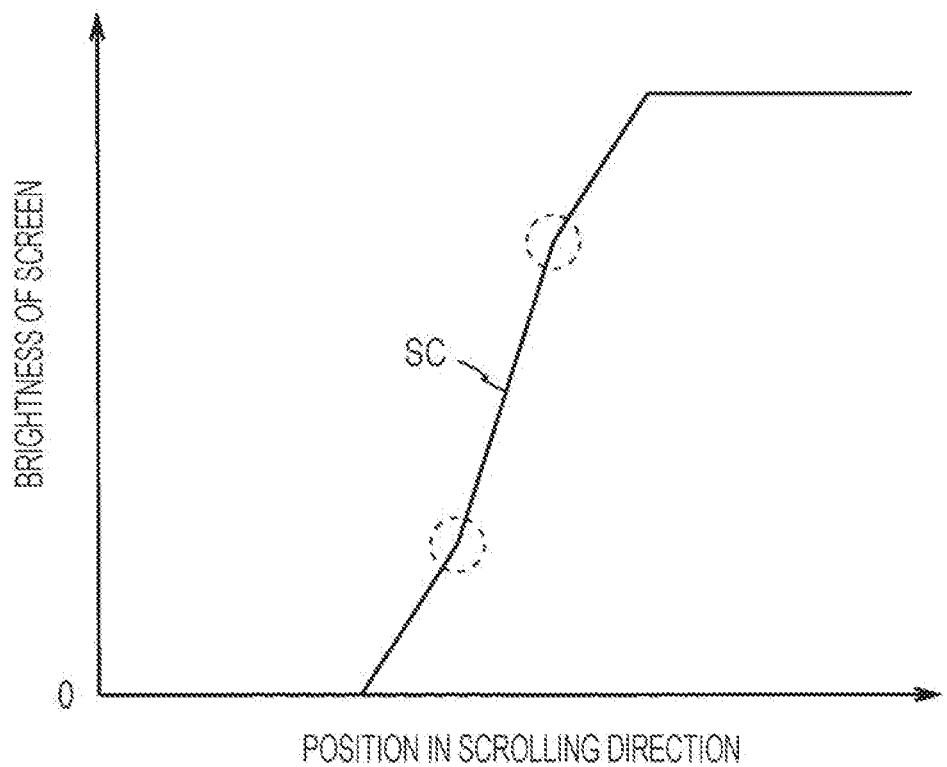
FIG. 8 is a diagram showing a moving image blurring waveform of the liquid crystal display device according to the comparative example.

FIG. 8 is a diagram showing a moving image blurring waveform at the screen center SC in the liquid crystal display device according to the comparative example. The moving image blurring waveform shown in FIG. 8 is a finding of how a boundary division between a black region and a white region looks in a case where the liquid crystal panel performs an ideal rectangular response and the border between the white region and the black region moves at a certain speed in a horizontal direction within the display screen. The moving image blurring waveform shown in FIG. 8 has inflection points formed inside two circles indicated by dotted lines, respectively. For this reason, the liquid crystal display device according to the comparative example has lower moving image display performance.

Figure 9:
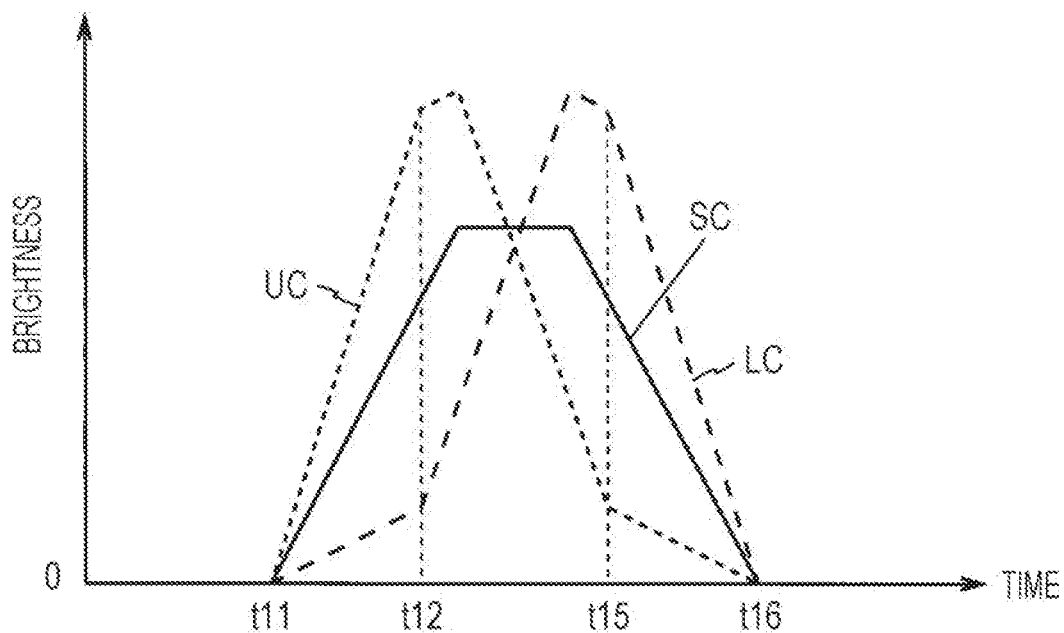
FIG. 9 is a diagram showing changes in brightness of the backlight of the liquid crystal display device according to the first embodiment.

FIG. 9 is a diagram showing changes in brightness of the backlight 16 at the three positions in the liquid crystal display device 10 according to the present embodiment. In the liquid crystal display device 10 according to the present embodiment, the sum of the brightness of the upper light sources and the brightness of the lower light sources stays the same in a middle portion (i.e. the period from the point of time t13 to the point of time t14) of the period of time during which both the upper light sources and the lower light sources glow. For this reason, as shown in FIG. 9, the brightness of the backlight 16 at the three positions does not abruptly change at a point of time other than the starting and ending points of a lighting period.

Figure 10:
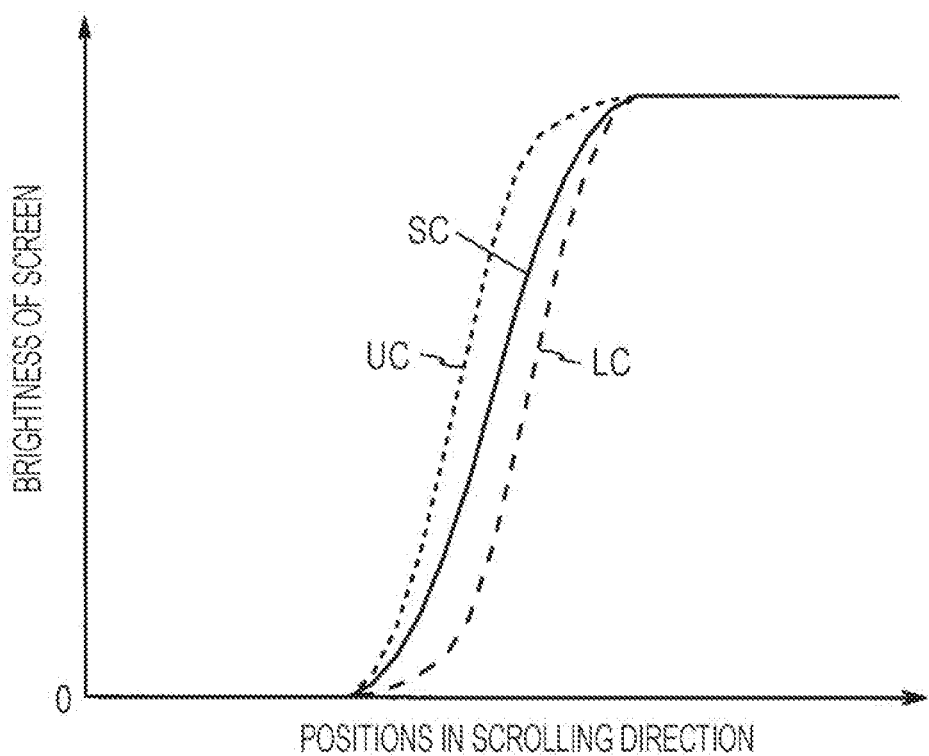
FIG. 10 is a diagram showing moving image blurring waveforms of the liquid crystal display device according to the first embodiment.

FIG. 10 is a diagram showing moving image blurring waveforms at the three positions in the liquid crystal display device 10 according to the present embodiment. The three types of moving image blurring waveform shown in FIG. 10 are ones found under the same conditions as the moving image blurring waveform shown in FIG. 8. The three types of moving image blurring waveform shown in FIG. 10 have no inflection points formed therein. Accordingly, the liquid crystal display device 10 according to the present embodiment makes it possible to attain higher moving image display performance.

Further, the liquid crystal display device according to the comparative example may have lower moving image display performance if there is an overlap between the lighting periods of the two areas during the change period in a case where the stable period is short. In such a case, the liquid crystal display device 10 according to the present embodiment can avoid a decrease in moving image display performance by reducing the brightness of light sources corresponding separately to each of the areas.

As noted above, the liquid crystal display device 10 according to the present embodiment is an image display device including a display panel (liquid crystal panel 15) including a plurality of pixels 17, a backlight 16 including a plurality of light sources 18, a panel drive circuit 13 that drives the display panel, and a backlight drive circuit 14 that drives the backlight 16. The backlight 16 is divided into a plurality of areas (i.e. the upper area 21 and the lower area 22) arranged in the same direction as an order of writing to the pixels 17. The backlight drive circuit 14 sets lighting periods for each of the areas, and causes the brightness of the light sources 18 to rise and drop in a non-step manner during a corresponding one of the lighting periods (FIG. 4). In a case where the plurality of areas include a first area (upper area 21) and a second area (lower area 22) that are adjacent to each other, there is a period of overlap (i.e. the period from the point of time t12 to the point of time t15) between a first lighting period (lighting period BU) set for the first area and a second lighting period (lighting period BL) set for the second area; and the period of overlap includes a middle portion (i.e. the period from the point of time t13 to the point of time t14) in which the brightness of first light sources (upper light sources) corresponding to the first area drops and the brightness of second light sources corresponding to the second area rises. In the middle portion of the period of overlap, the speed at which the brightness of the first light sources drops and the speed at which the brightness of the second light sources rises are the same as each other (both S1).

In the liquid crystal display device 10 according to the present embodiment, the sum of the brightness of the first light sources and the brightness of the second light sources stays the same in the middle portion of the period of overlap. Accordingly, the liquid crystal display device 10 according to the present embodiment makes it possible to, even in a case where the backlight 16 used suffers from light leakage, cancel out the effect of the light leakage at any position within the display screen and avoid an abrupt change in brightness of the first and second areas at a point of time other than the starting and ending points of a lighting period. This makes it possible to remove an inflection point from a moving image blurring waveform even in a case where the number of areas is small and attain higher moving image display performance.

Further, in the liquid crystal display device 10 according to the present embodiment, the way in which the brightness of the first light sources changes and the way in which the brightness of the second light sources changes are the same as each other, and are symmetrical about the middle (i.e. a point of time (t11+t16)/2) of a period of time during which at least either the first light sources or the second light sources glow. The speed at which the brightness of the light sources 18 rises and the speed at which the brightness of the light sources 18 drops are the same as each other (both S1). The way in which the brightness of the light sources 18 rises and the way in which the brightness of the light sources 18 drops are symmetrical about the middle of the corresponding one of the lighting periods. For example, the way in which the brightness of the upper light sources rises and the way in which the brightness of the upper light sources drops are symmetrical about the middle (i.e. a point of time (t11+t15)/2) of the lighting period of the upper light sources. Using such a configuration makes it possible to easily control the brightness of the light sources 18 and reduce the amount of circuitry of the backlight drive circuit 14.

The length of the period of overlap is longer than ⅓ of the length of a period of time during which at least either the upper light sources or the lower light sources glow (i.e. a period from the point of time t11 to the point of time t16). This makes it possible to avoid the formation of an inflection point in a moving image blurring waveform by lengthening a period of time during which the brightness of the first light sources drops and the brightness of the second light sources rises.

Second Embodiment

A liquid crystal display device according to a second embodiment has the same configuration as and operates in accordance with the same timings as the liquid crystal display device according to the first embodiment (see FIGS. 1 to 3). The following describes points of difference from the first embodiment.

Figure 11:
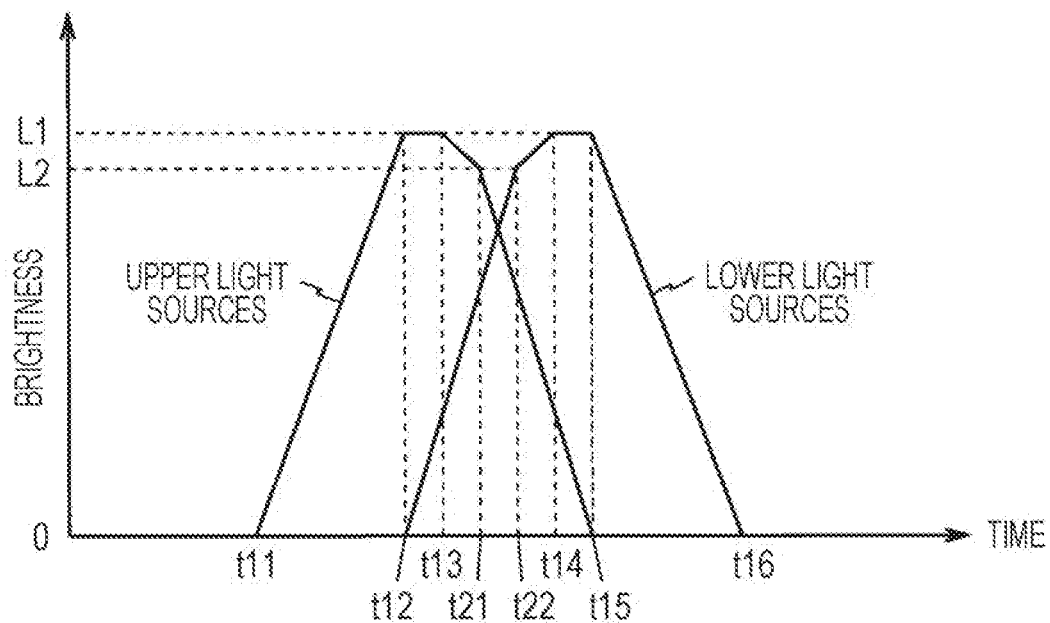
FIG. 11 is a diagram showing changes in brightness of light sources corresponding separately to each of areas of a liquid crystal display device according to a second embodiment.

FIG. 11 is a diagram showing changes in brightness of light sources corresponding separately to each of areas of the liquid crystal display device according to the present embodiment. As shown in FIG. 11, the brightness of the upper light sources rises from 0 to the level L1 at the speed S1 during the period from the point of time t11 to the point of time t12, keeps the level L1 during the period from the point of time t12 to the point of time t13, drops from the level L1 to a level L2 at a speed S2 (<S) during a period from the point of time t13 to a point of time t21, and drops from the level L2 to 0 at a speed S3 (>S1) during a period from the point of time t21 to the point of time t15. The length of the period of time during which the brightness of the upper light source rises and the length of the periods of time during which the brightness of the upper light sources drops are the same as each other.

The brightness of the lower light source changes symmetrically with respect to the brightness of the upper light sources. The brightness of the lower light sources rises from 0 to the level L2 at the speed S3 during a period from the point of time t12 to a point of time t22, rises from the level L2 to the level L1 at the speed S2 during a period from the point of time t22 to the point of time t14, keeps the level L1 during the period from the point of time t14 to the point of time t15, and drops from the level L1 to 0 at the speed S1 during the period from the point of time t15 to the point of time t16. The way in which the brightness of the upper light sources changes and the way in which the brightness of the lower light sources change are symmetrical about the middle (i.e. the point of time (t11+t16)/2) of a period of time during which at least either the upper light sources or the lower light sources glow.

During the period from the point of time t12 to the point of time t15, both the upper light sources and the lower light sources glow. During the period from the point of time t13 to the point of time t14, the brightness of the upper light sources drops, and the brightness of the lower light sources rises. During the period from the point of time t13 to the point of time t14, the speed at which the brightness of the upper light sources drops and the speed at which the brightness of the lower light sources rises are the same as each other (both S2 or S3). The length of the period of time (t12−t11) is shorter than a half of the length (t15−t11) of the lighting period of the upper light sources. The length of the period of time during which both the upper light sources and the lower light sources glow is longer than ⅓ of the length of the period of time during which at least either the upper light sources or the lower light sources glow.

In the liquid crystal display device according to the present embodiment, as in the case of the first embodiment, since, during the period from the point of time t13 to the point of time t14, the speed at which the brightness of the upper light sources drops and the speed at which the brightness of the lower light sources rises are the same as each other, the sum of the brightness of the upper light sources and the brightness of the lower light sources stays the same.

Figure 12:
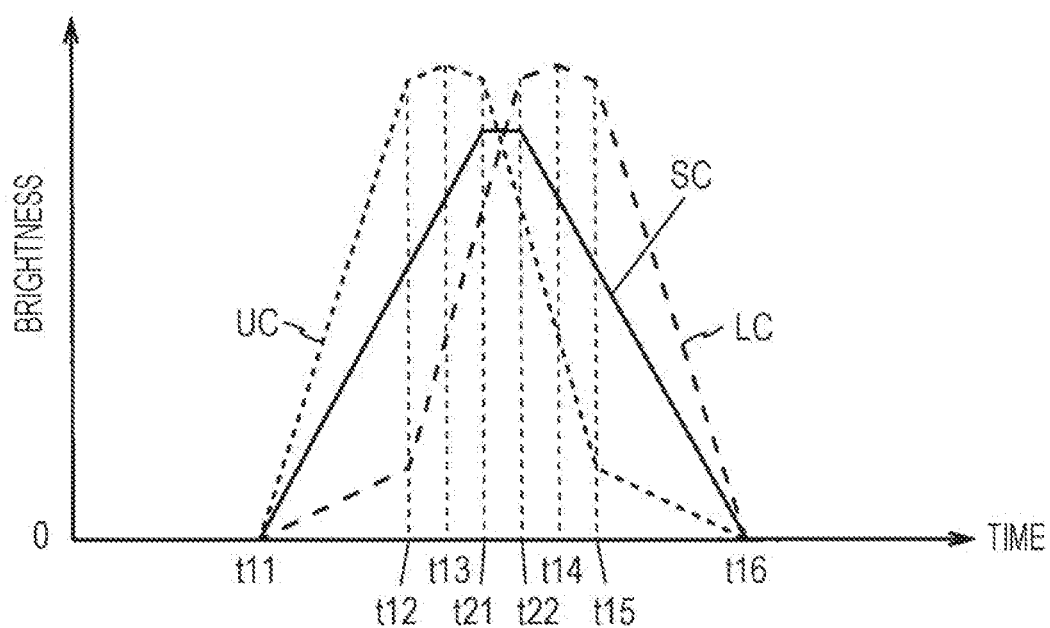
FIG. 12 is a diagram showing changes in brightness of the backlight of the liquid crystal display device according to the second embodiment.
Figure 13:
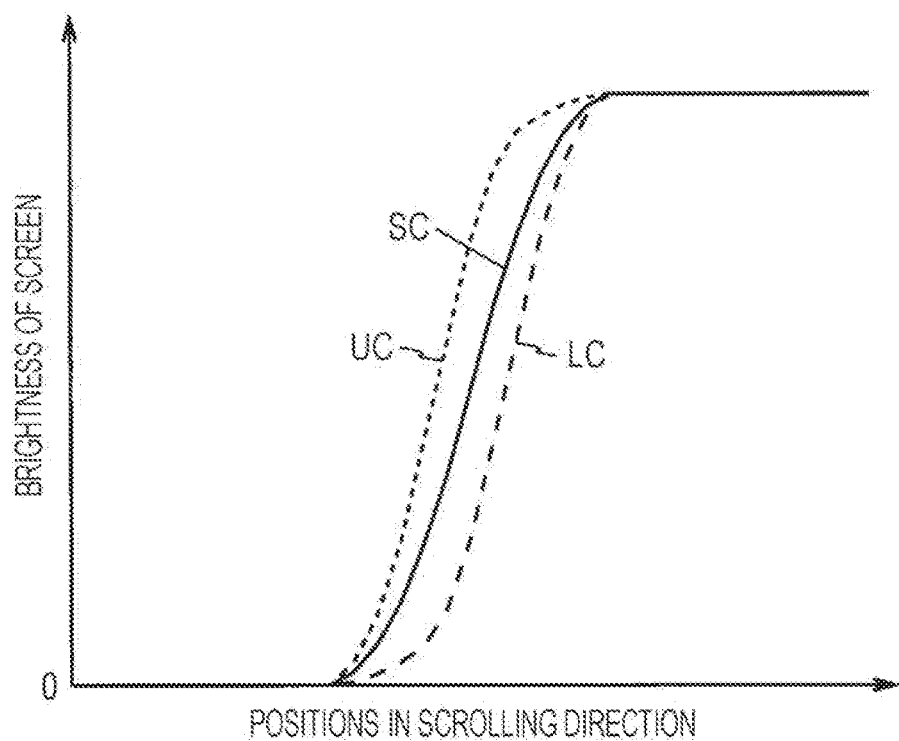
FIG. 13 is a diagram showing moving image blurring waveforms of the liquid crystal display device according to the second embodiment.

FIG. 12 is a diagram showing changes in brightness of the backlight 16 at the three positions in the liquid crystal display device according to the present embodiment. FIG. 13 is a diagram showing moving image blurring waveforms at the three positions in the liquid crystal display device according to the present embodiment. The three types of moving image blurring waveform shown in FIG. 13 are ones found under the same conditions as those of the first embodiment. As shown in FIG. 12, the brightness of the backlight 16 at the three positions does not abruptly change at a point of time other than the starting and ending points of a lighting period. The three types of moving image blurring waveform shown in FIG. 13 have no inflection points formed therein. Accordingly, the liquid crystal display device according to the present embodiment makes it possible to attain higher moving image display performance.

Further, contrast between FIGS. 9 and 12 shows that the liquid crystal display device according to the present embodiment is higher than that according to the first embodiment in terms of the brightness of the screen center SC during the period of time during which both the upper light sources and the lower light sources glow. Accordingly, the liquid crystal display device according to the present embodiment makes it possible to attain further higher moving image display performance.

In the liquid crystal display device according to the present embodiment, the way in which the brightness of the first light sources (upper light sources) changes and the way in which the brightness of the second light sources (lower light sources) changes are symmetrical about the middle (i.e. the point of time (t11+t16)/2) of a period of time during which at least either the first light sources or the second light sources glow. The way in which the brightness of the light sources 18 rises and the way in which the brightness of the light sources 18 drops are asymmetrical about the middle of the corresponding one of the lighting periods. For example, the way in which the brightness of the upper light sources rises and the way in which the brightness of the upper light sources drops are asymmetrical about the middle (i.e. the point of time (t11+t15)/2) of the lighting period of the upper light sources. The liquid crystal display device thus configured, too, makes it possible to attain higher moving image display performance by avoiding the formation of an inflection point in a moving image blurring waveform.

Third Embodiment

A liquid crystal display device according to a third embodiment has the same configuration as the liquid crystal display devices according to the first and second embodiments (see FIGS. 1 and 2). The following describes points of difference from the first and second embodiments.

Figure 14:
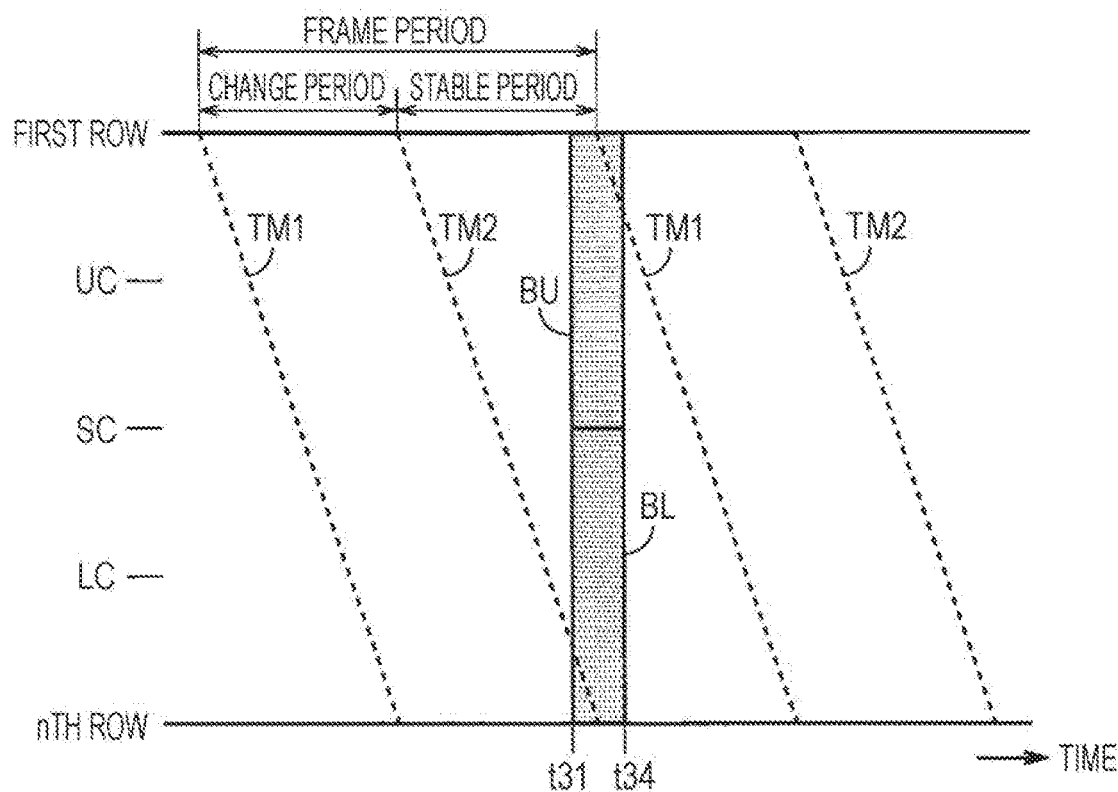
FIG. 14 is a diagram showing timings of operation of the liquid crystal display device according to a third embodiment.

FIG. 14 is a diagram showing timings of operation of the liquid crystal display device according to the present embodiment. In FIG. 14, the shaded area BU indicates a lighting period set for the upper area 21 (i.e. a lighting period of the upper light source), and the shaded area BL indicates a lighting period set for the lower area 22 (i.e. a lighting of the lower light sources). In the present embodiment, the lighting period of the upper light sources and the lighting period of the lower light sources are the same as each other.

Figure 15:
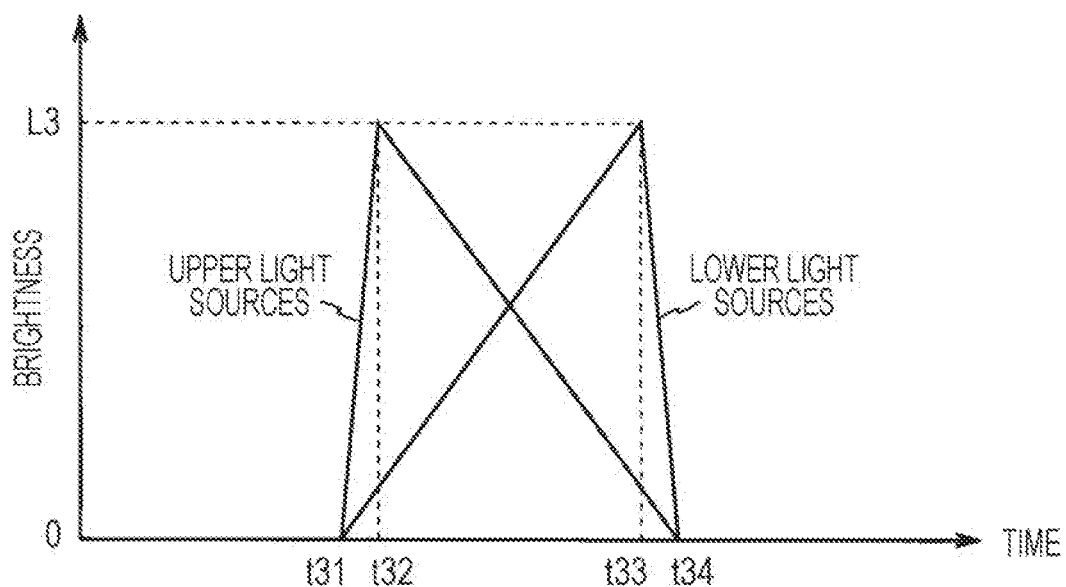
FIG. 15 is a diagram showing changes in brightness of light sources corresponding separately to each of areas of the liquid crystal display device according to the third embodiment.

FIG. 15 is a diagram showing changes in brightness of light sources corresponding separately to each of areas of the liquid crystal display device according to the present embodiment. As shown in FIG. 15, the brightness of the upper light sources rises from 0 to a level L3 at a speed S4 during a period from a point of time t31 to a point of time t32 and drops at a speed S5 (<S4) during a period from the point of time t32 to a point of time t34. The length of the period of time during which the brightness of the upper light sources rises and the length of the period of time during which the brightness of the upper light sources drops are different from each other.

The brightness of the lower light sources changes symmetrically with respect to the brightness of the upper light sources. The brightness of the lower light sources rises from 0 to the level L3 at the speed S5 during a period from the point of time t31 to a point of time t33 and drops at the speed S4 during a period from the point of time t33 to the point of time t34. The way in which the brightness of the upper light sources changes and the way in which the brightness of the lower light sources changes are symmetrical about the middle (i.e. a point of time (t31+t34)/2) of a period of time during which at least either the upper light sources or the lower light sources glow.

During a period from the point of time t31 to the point of time t34, both the upper light sources and the lower light sources glow. During a period from the point of time t32 to the point of time t33, the brightness of the upper light sources drops, and the brightness of the lower light sources rises. During the period from the point of time t32 to the point of time t33, the speed at which the brightness of the upper light sources drops and the speed at which the brightness of the lower light sources rises are the same as each other (both S5). During the period from the point of time t32 to the point of time t33, the sum of the brightness of the upper light sources and the brightness of the lower light sources stays the same.

Figure 16:
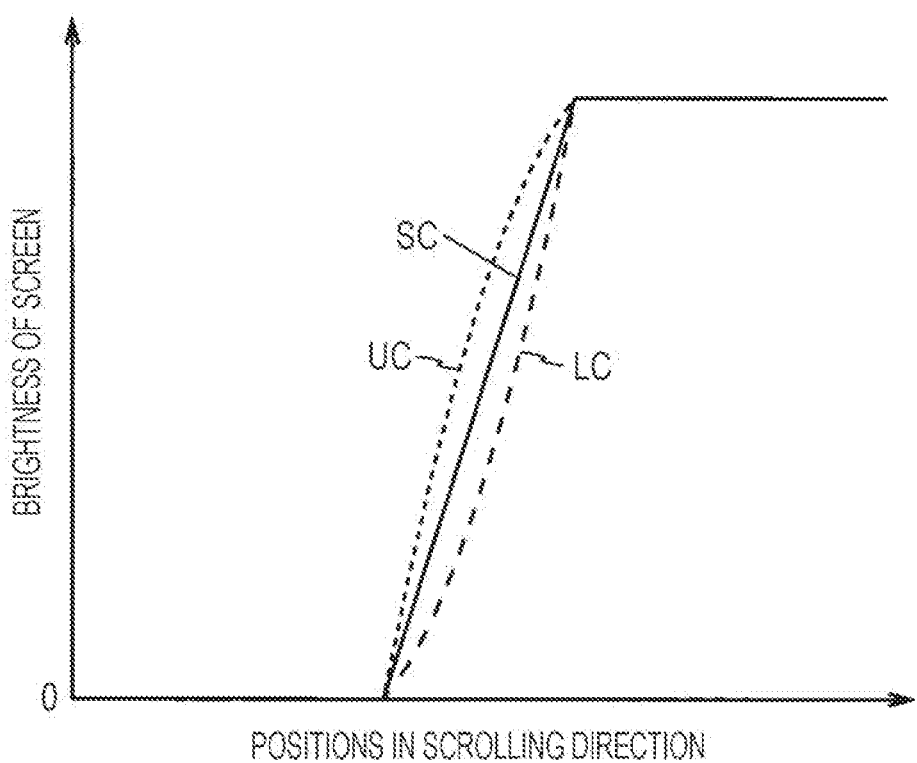
FIG. 16 is a diagram showing moving image blurring waveforms of the liquid crystal display device according to the third embodiment.

FIG. 16 is a diagram showing moving image blurring waveforms at the three positions in the liquid crystal display device according to the present embodiment. The three types of moving image blurring waveform shown in FIG. 16 are ones found under the same conditions as those of the first and second embodiments. The three types of moving image blurring waveform shown in FIG. 16 have no inflection points formed therein. Accordingly, the liquid crystal display device according to the present embodiment makes it possible to attain higher moving image display performance.

In the liquid crystal display device according to the present embodiment, the way in which the brightness of the first light sources (upper light sources) changes and the way in which the brightness of the second light sources (lower light sources) changes are symmetrical about the middle (i.e. the point of time (t31+t34)/2) of a period of time during which at least either the first light sources or the second light sources glow. The way in which the brightness of the light sources 18 rises and the way in which the brightness of the light sources 18 drops are asymmetrical about the middle of the corresponding one of the lighting periods. For example, the way in which the brightness of the upper light sources rises and the way in which the brightness of the upper light sources drops are asymmetrical about the middle (i.e. the point of time (t31+t34)/2) of the lighting period of the upper light sources. The liquid crystal display device thus configured, too, makes it possible to attain higher moving image display performance by avoiding the formation of an inflection point in a moving image blurring waveform.

Fourth Embodiment

A liquid crystal display device according to a fourth embodiment has the same overall configuration as the liquid crystal display devices according to the first to third embodiments (see FIG. 1), and the backlight 16 is divided into three areas. The following describes points of difference from the first to third embodiments.

Figure 17:
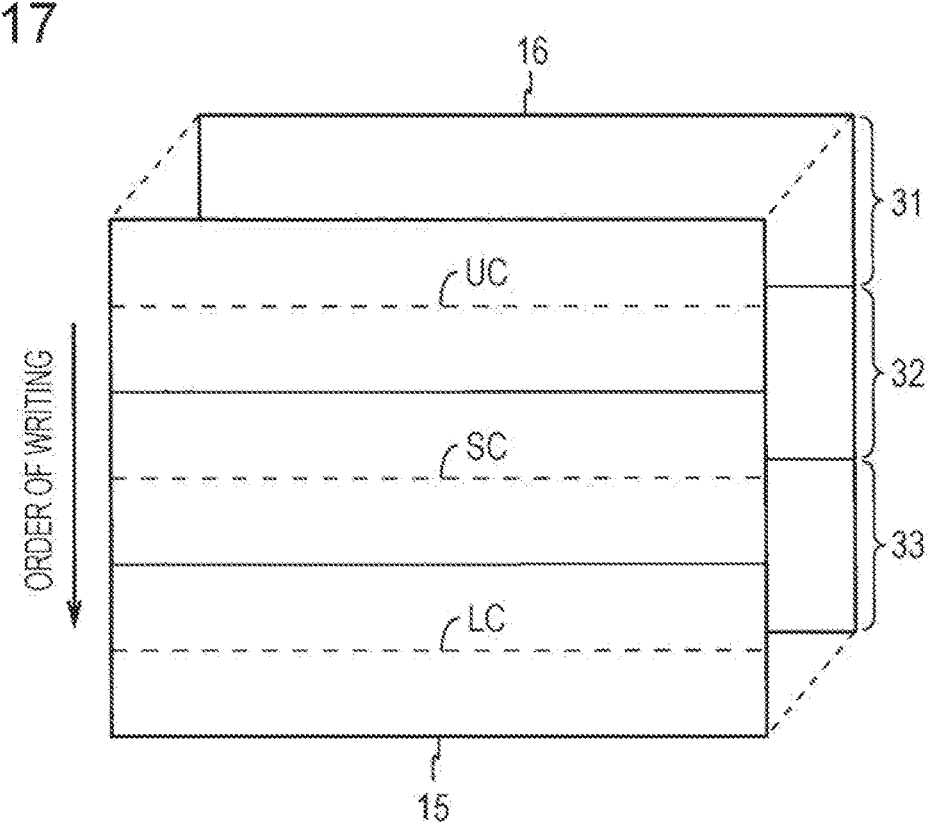
FIG. 17 is a diagram showing a method for dividing a backlight of a liquid crystal display device according to a fourth embodiment.

FIG. 17 is a diagram showing a method for dividing the backlight 16 of the liquid crystal display device according to the present embodiment. As shown in FIG. 17, the display screen is divided into three equal parts that are on top of each other. The backlight 16 is divided into an upper area 31 that corresponds to the upper ⅓ of the display screen, a central area 32 that corresponds to the central ⅓ of the display screen, and a lower area 33 that corresponds to the lower ⅓ of the display screen.

In the present embodiment, those of the light sources 18 which correspond to the upper area 31 are referred to as "upper light sources", those of the light sources 18 which correspond to the central area 32 are referred to as "central light sources", and those of the light sources 18 which correspond to the lower area 33 are referred to as "lower light sources". Further, the upper center UC indicates a position at which the upper ⅓ of the display screen is divided into two equal halves, one above the other, the screen center SC indicates a position at which the central ⅓ of the display screen is divided into two equal halves, one above the other, and the lower center LC indicates a position at which the lower ⅓ of the display screen is divided into two equal halves, one above the other. These three positions are referred to collectively as "three positions".

The brightness data BD includes data representing changes in brightness of the upper light sources within one frame period, data representing changes in brightness of the central light sources within one frame period, and data representing changes in brightness of the lower light sources within one frame period. The backlight drive circuit 14 effects changes in brightness of the upper light sources during the lighting period BU of the upper light sources, effects changes in brightness of the central light sources during the lighting period BC of the central light sources, and effects changes in brightness of the lower light sources during the lighting period BL of the lower light sources.

Figure 18:
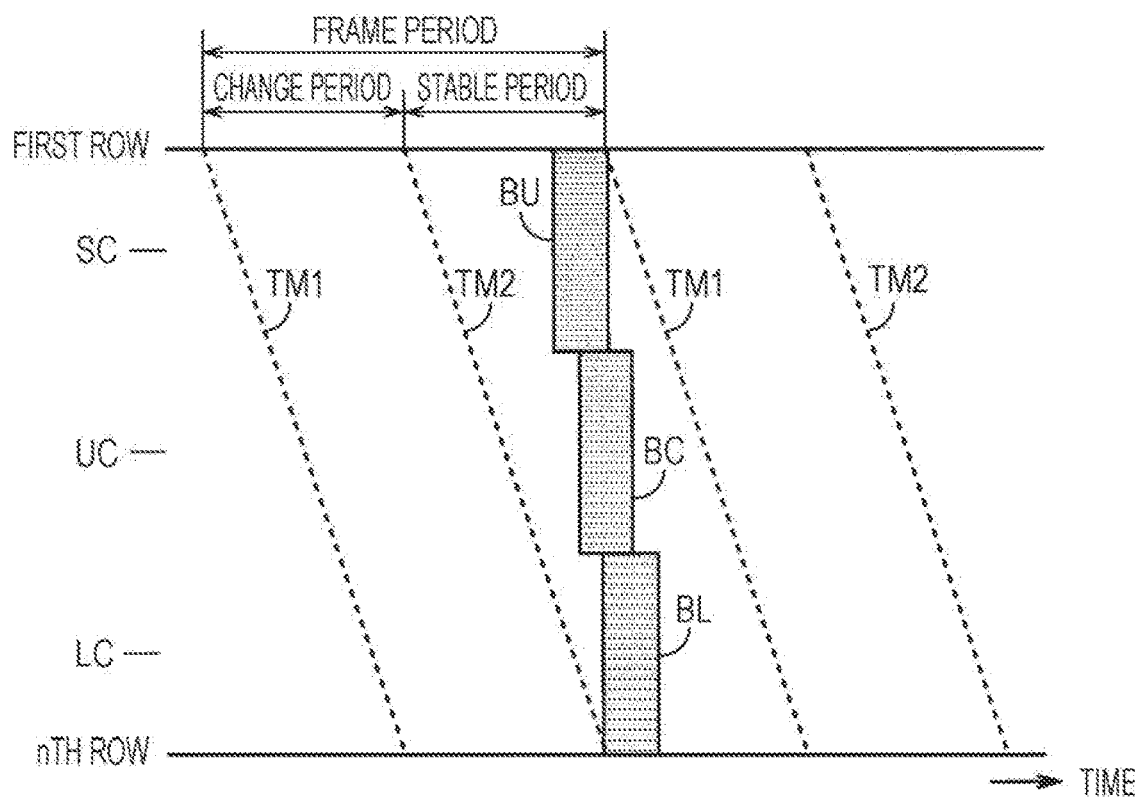
FIG. 18 is a diagram showing timings of operation of the liquid crystal display device according to the fourth embodiment.

FIG. 18 is a diagram showing timings of operation of the liquid crystal display device according to the present embodiment. In FIG. 18, the shaded area BU indicates a lighting period set for the upper area 31 (i.e. a lighting period of the upper light sources), the shaded area BC indicates a lighting period set for the central area 32 (i.e. a lighting period of the central light sources), and the shaded area BL indicates a lighting period set for the lower area 33 (i.e. a lighting period of the lower light sources).

Figure 19:
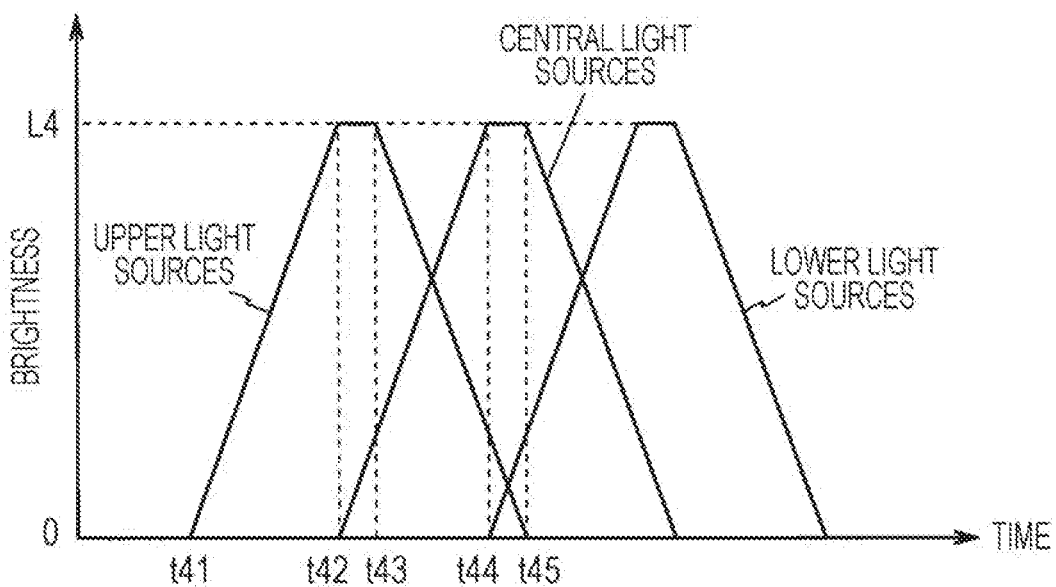
FIG. 19 is a diagram showing changes in brightness of light sources corresponding separately to each of areas of the liquid crystal display device according to the fourth embodiment.

FIG. 19 is a diagram showing changes in brightness of light sources corresponding separately to each of areas of the liquid crystal display device according to the present embodiment. As shown in FIG. 19, the brightness of the upper light sources rises from 0 to a level L4 at a speed S6 during a period from a point of time t41 to a point of time t42, keeps the level L4 during a period from the point of time t42 to a point of time t43, and drops from the level L4 to 0 at the speed S6 during a period from the point of time t43 to a point of time t45.

The brightness of the central light sources changes in the same way as the brightness of the upper light sources a period of time (t42−t41) behind the brightness of the upper light sources. The brightness of the lower light sources changes in the same way as the brightness of the central light sources a period of time (t44−t42) behind the brightness of the central light sources. The length of the period of time (t42−t41) and the length of the period of time (t44−t42) are the same as each other.

Figure 20:
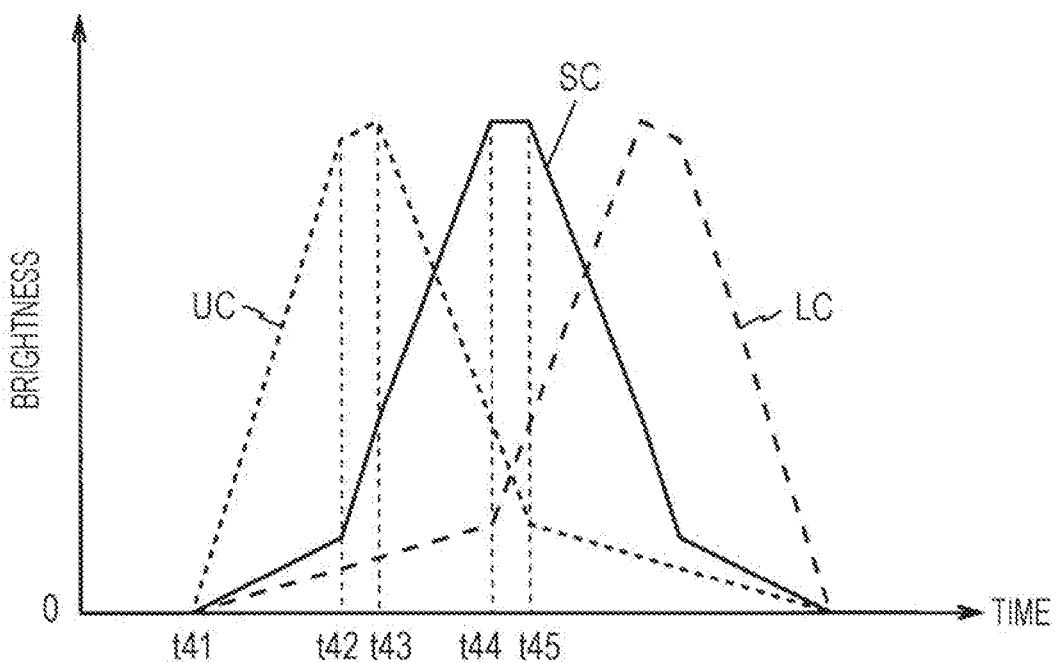
FIG. 20 is a diagram showing changes in brightness of the backlight of the liquid crystal display device according to the fourth embodiment.
Figure 21:
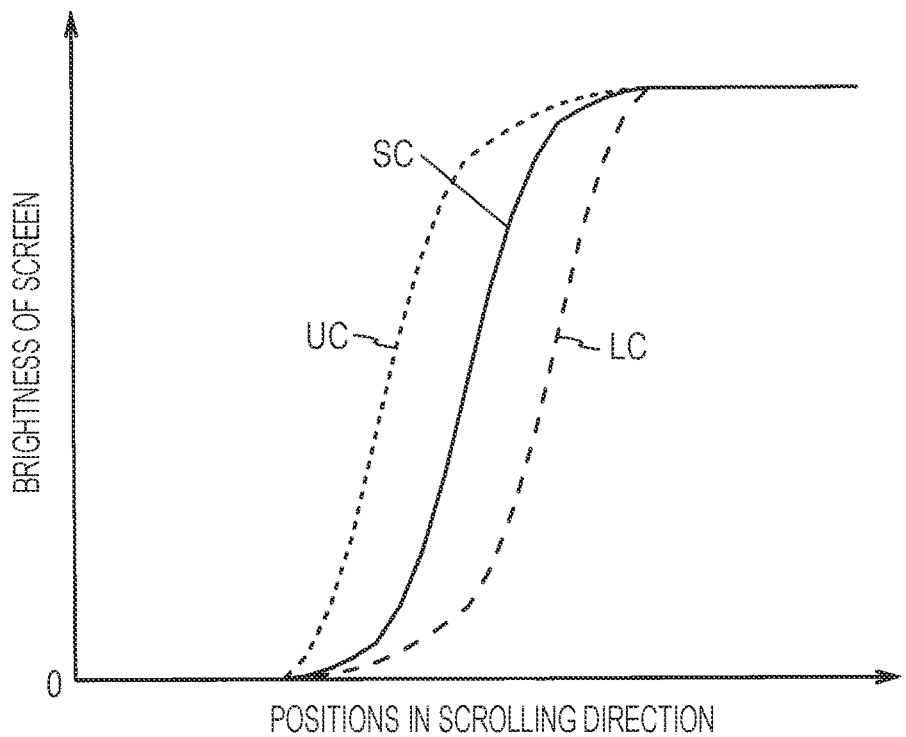
FIG. 21 is a diagram showing moving image blurring waveforms of the liquid crystal display device according to the fourth embodiment.
Figure 22:
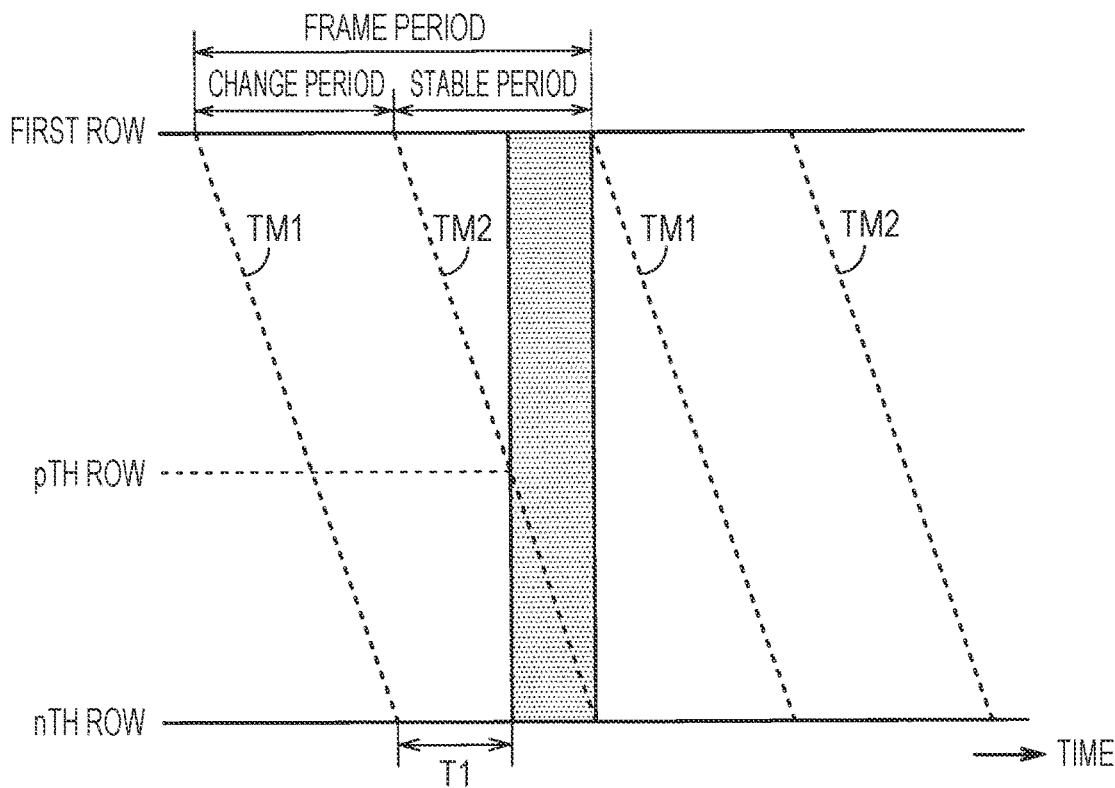
FIG. 22 is a diagram showing timings of operation of a liquid crystal display device that performs flashing driving.
Figure 23:
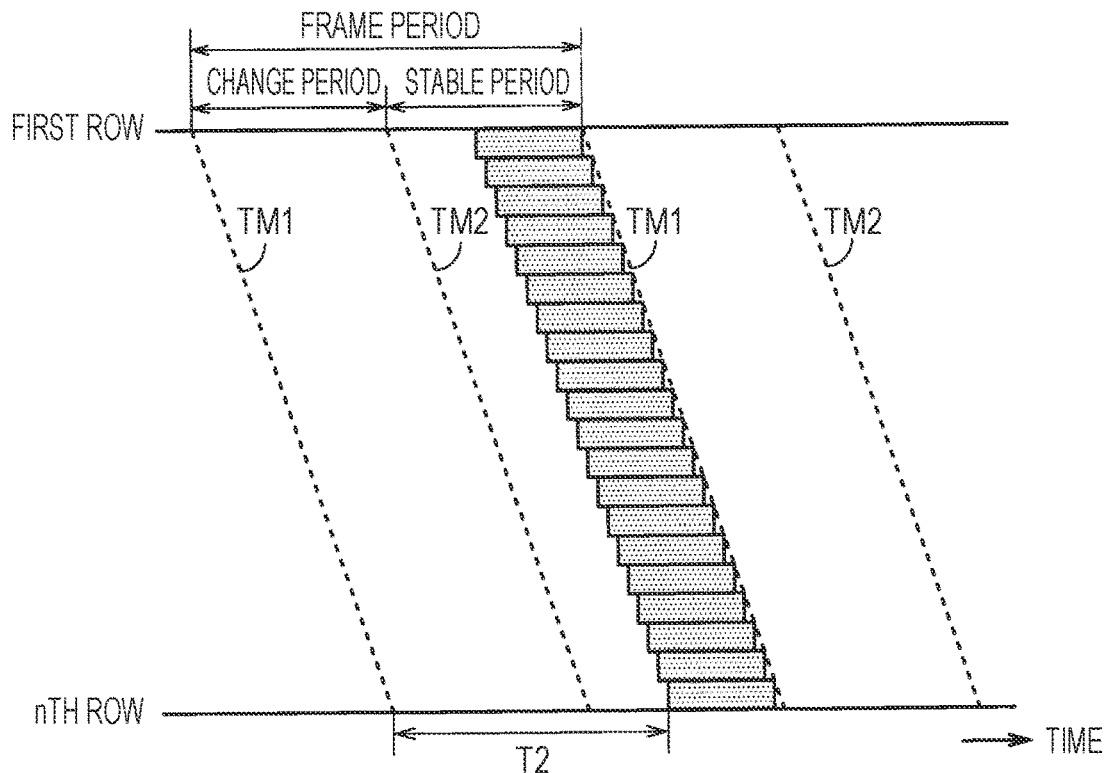
FIG. 23 is a diagram showing timings of operation of a liquid crystal display device that performs scan driving.
Figure 24:
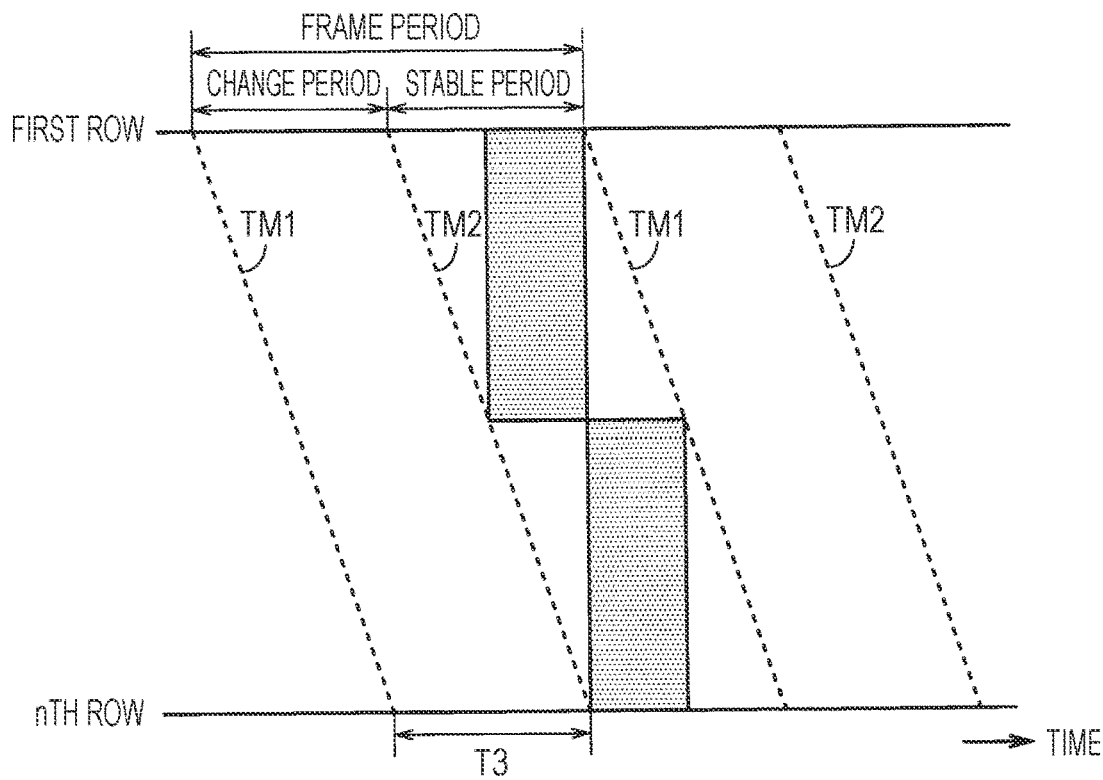
FIG. 24 is a diagram showing timings of operation of another liquid crystal display device that performs scan driving.

FIG. 20 is a diagram showing changes in brightness of the backlight 16 at the three positions in the liquid crystal display device according to the present embodiment. FIG. 21 is a diagram showing moving image blurring waveforms at the three positions in the liquid crystal display device according to the present embodiment. The three types of moving image blurring waveform shown in FIG. 21 are ones found under the same conditions as those of the first to third embodiments. As shown in FIG. 20, the brightness of the backlight 16 at the three positions does not abruptly change at a point of time other than the starting and ending points of a lighting period. The three types of moving image blurring waveform shown in FIG. 21 have no inflection points formed therein. Accordingly, the liquid crystal display device according to the present embodiment makes it possible to attain higher moving image display performance.

In the liquid crystal display device according to the present embodiment, the backlight 16 is divided into three areas. In a modification of the present embodiment, a liquid crystal display device whose backlight 16 is divided into three or more areas by a similar method may be configured. Such a liquid crystal display device, too, makes it possible to attain higher moving image display performance by avoiding the formation of an inflection point in a moving image blurring waveform.

While the present disclosure has been described above in detail, the foregoing description is not restrictive but illustrative in all aspects. It can be understood that a large number of other variations and modifications can be devised without departing from the scope of the present disclosure.

The present disclosure contains subject matter related to that disclosed in U.S. Provisional Patent Application No. 62/881,492 filed in the United States Patent Office on Aug. 1, 2019, the entire contents of which are hereby incorporated by reference.

What is claimed is:

1. An image display device comprising:
a display panel including a plurality of pixels;
a backlight including a plurality of light sources;
a panel drive circuit that drives the display panel; and
a backlight drive circuit that drives the backlight, wherein
the backlight is divided into a plurality of areas arranged in a same direction as an order of writing to the pixels,
the backlight drive circuit sets lighting periods separately for each of the areas and causes a brightness of the light sources to rise and drop in a non-step manner during a corresponding one of the lighting periods,
in a case where the plurality of areas include a first area and a second area that are adjacent to each other, there is a period of overlap between a first lighting period set for the first area and a second lighting period set for the second area, and
the period of overlap includes a middle portion in which a brightness of first light sources corresponding to the first area drops and a brightness of second light sources corresponding to the second area rises.

2. The image display device according to claim 1, wherein in the middle portion of the period of overlap, a speed at which the brightness of the first light sources drops and a speed at which the brightness of the second light sources rises are identical to each other.

3. The image display device according to claim 2, wherein a way in which the brightness of the first light sources changes and a way in which the brightness of the second light sources changes are identical to each other.

4. The image display device according to claim 2, wherein a way in which the brightness of the first light sources changes and a way in which the brightness of the second light sources changes are symmetrical about a middle of a period of time during which at least either the first light sources or the second light sources glow.

5. The image display device according to claim 2, wherein a speed at which the brightness of the light sources rises and a speed at which the brightness of the light sources drops are identical to each other.

6. The image display device according to claim 5, wherein a way in which the brightness of the light sources rises and a way in which the brightness of the light sources drops are symmetrical about a middle of the corresponding one of the lighting periods.

7. The image display device according to claim 5, wherein a way in which the brightness of the light sources rises and a way in which the brightness of the light sources drops are asymmetrical about a middle of the corresponding one of the lighting periods.

8. The image display device according to claim 2, wherein a length of the period of overlap is longer than ⅓ of a length of a period of time during which at least either the first light sources or the second light sources glow.

9. The image display device according to claim 2, wherein the first lighting period and the second lighting period are identical to each other.

10. The image display device according to claim 2, wherein the backlight is divided into two areas.

11. The image display device according to claim 2, wherein the backlight is divided into three or more areas.

12. The image display device according to claim 2, wherein the display panel is a liquid crystal panel.

13. An image display method for an image display device having a display panel including a plurality of pixels and a backlight including a plurality of light sources, the image display method comprising:
driving the display panel; and
driving the backlight,
wherein
the backlight is divided into a plurality of areas arranged in a same direction as an order of writing to the pixels,
the driving the backlight includes setting lighting periods separately for each of the areas and causing a brightness of the light sources to rise and drop in a non-step manner during a corresponding one of the lighting periods,
in a case where the plurality of areas include a first area and a second area that are adjacent to each other, there is a period of overlap between a first lighting period set for the first area and a second lighting period set for the second area, and
the period of overlap includes a middle portion in which a brightness of first light sources corresponding to the first area drops and a brightness of second light sources corresponding to the second area rises.

14. The image display method according to claim 13, wherein in the middle portion of the period of overlap, a speed at which the brightness of the first light sources drops and a speed at which the brightness of the second light sources rises are identical to each other.

* * * * *